Dec. 17, 1957 Q. PALAZZO 2,816,527
ROTARY FOUR-STROKE ENGINE
Filed Oct. 22, 1954 2 Sheets-Sheet 1

INVENTOR:
QUIRINO PALAZZO
by Walter S. Heston
ATTORNEY

Dec. 17, 1957  Q. PALAZZO  2,816,527
ROTARY FOUR-STROKE ENGINE
Filed Oct. 22, 1954  2 Sheets-Sheet 2
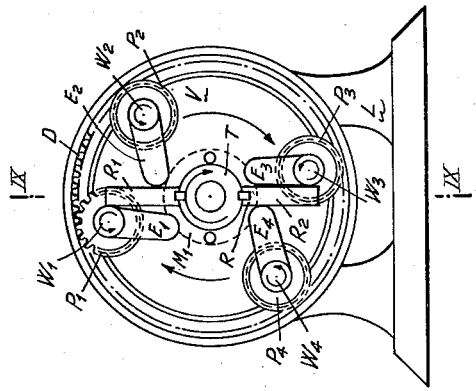
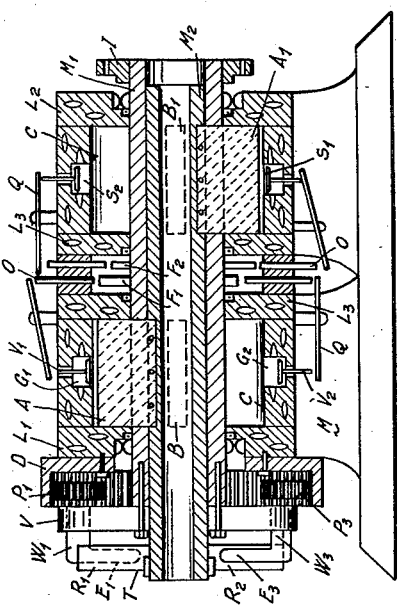
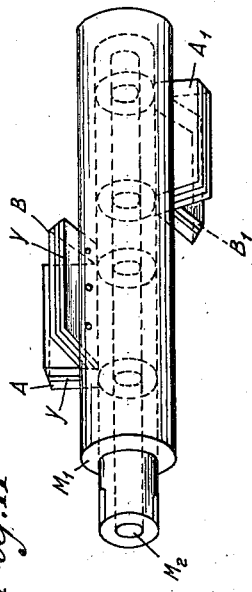
INVENTOR:
QUIRINO PALAZZO
by Walter S. Hestor
ATTORNEY

United States Patent Office 2,816,527
Patented Dec. 17, 1957

2,816,527

ROTARY FOUR-STROKE ENGINE

Quirino Palazzo, Vasto, Italy

Application October 22, 1954, Serial No. 464,128

Claims priority, application Italy October 28, 1953

6 Claims. (Cl. 123—11)

The present invention relates to an internal combustion engine of the rotary type with a four-stroke cycle.

It is well known that in recent years the efficiency of the usual reciprocating piston engines has achieved highest values which can be exceeded only by the discovery of novel metal alloys adapted to bear the pulsating loads transmitted from the reciprocating pistons to the crankshaft. Many attempts have been made to replace the reciprocating piston engines in order to do without a crankshaft, but hitherto the attempts lacked practical results. A solution of this problem can be reached by the provision of endothermic steam or gas turbines, but there are serious difficulties to overcome when a reduced power is required. Other attempts have been made by the provision of so-called rotary engines but the operation of this type of engines was made possible only by delicate expensive air compression devices.

These defects which affect the serviceableness of a rotary engine have been overcome by the present invention, according to which two rotating coaxial members provided with a pair of projecting movable blades are adapted to perform a usual four-stroke cycle without the provision of the above mentioned air compression devices.

Another object of this invention is to provide a four-stroke rotary engine wherein the power or main rotating member is a hollow outer shaft which has a slot formed therein and a blade fixed on and projecting radially from its outer wall. A secondary rotating member is coaxially inserted into and movable angularly relatively to the main rotating member, and is also provided with a blade projecting radially therefrom through the slot in the main rotating member, the radially projecting blade being adapted to slide with its outer edges on the inner wall of a stationary cylinder so as to divide the bore of the stationary cylinder in two sealed chambers, wherein the volumetric ratio of one of the chambers to the other one is variable during the rotation of the main and secondary members on account of the angular displacement of the blade of the secondary member to the other blade, and the volumetric variation of the chambers can be so adjusted and controlled that at least one four-stroke cycle will be performed on each turn of the main and secondary members.

The invention is fully described in the following specification, and one embodiment thereof is illustrated in the accompanying drawings, in which:

Figures 1 to 8 inclusive are diagrammatic cross-sectional views showing the reciprocal positions of the essential members of a rotary internal combustion engine according to the invention, the movable members of the said embodiment being adapted to perform two four-stroke cycles per turn;

Figure 9 is a sectional side elevation of a complete rotary engine according to the invention, taken on the line IX—IX in Figure 10;

Figure 10 is a front view of the same complete rotary engine as shown in Figure 9; and Figure 11 is a perspective view of the rotating members of the internal combustion engine according to the invention.

Figure 1:
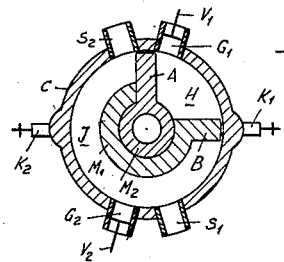
Figure 2:
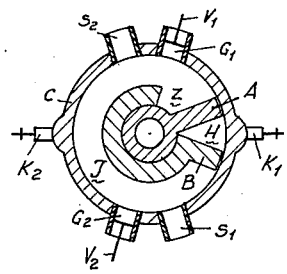

Referring to the drawing, my rotary internal combustion engine includes a stationary cylinder C in which two rotating coaxial shafts $M_1$ and $M_2$ are contained, the common axis of the said shafts being coincident with the axis of the stationary cylinder. The angular position of the two coaxial shafts $M_1$ and $M_2$ can be varied during their rotation and, for this purpose, the inner or secondary shaft $M_2$ is made slidable angularly within the outer or main shaft $M_1$. The maximum of the angular displacement of the inner shaft with regard to the outer shaft is 90° and this result can be attained by providing a rectangular slot or aperture Z (Figs. 2, 4, 6, 8) cut in the cylindrical wall of the said outer shaft $M_1$, as will be explained hereinafter. Fixed to or integral with the outer shaft $M_1$ is a longitudinal blade or paddle B projecting radially from a longitudinal edge of the rectangular slot or aperture Z. The length of the blade B corresponds to the length of the cylindrical bore in the stationary cylinder C, whereas the height of the blade is so designed that its outer edge bears slidably on the wall of the cylindrical bore. Fixed to or integral with the inner shaft $M_2$ there is another longitudinal blade or paddle A projecting radially from the cylindrical wall of the inner shaft through the slot or aperture Z into the outer shaft $M_1$, the length and the height of the blade A being so designed that its peripheral edges bear slidably on the walls of the bore in the stationary cylinder C. The peripheral edges of the blades A and B, moreover, can be provided with packing strips Y (Fig. 11) in order to divide the bore of the stationary cylinder C in two sealed chambers H and J. Owing to the reciprocal angular shifting of the two shafts $M_1$ and $M_2$ during their rotation, the two blades A and B will be also moved angularly in relation to each other, hence the volumetric ratio of the sealed chambers H and J will be varied continuously so as to set up one four-stroke cycle per each half-turn of the rotating shafts $M_1$ and $M_2$. The blades A and B may be referred to as "rotating pistons" because the angular movement of the blade A towards the blade B, during their rotation, will cause the compression and the discharge of the combustion gases enclosed in the chamber H, whereas the angular motion of the blade A away from the blade B will cause the admission or suction of the combustion gases into the chamber H.

Figure 3:
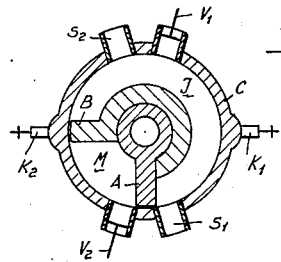
Figure 4:
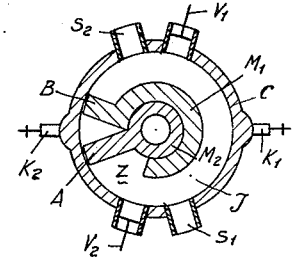
Figure 5:
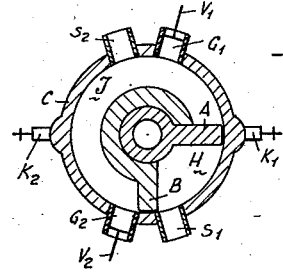
Figure 6:
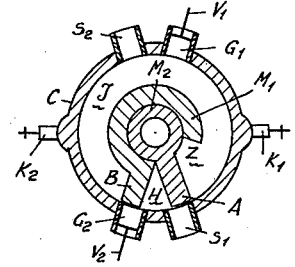
Figure 7:
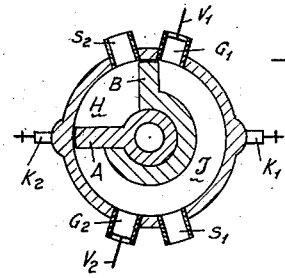
Figure 8:
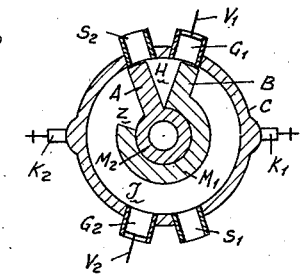

The angular positions of the blades A and B during two four-stroke cycles are shown successively in Figs. 1 to 8 inclusive, the angular position shown in each of these figures being relative to the end of each stroke of the four-stroke cycles. More particularly, the angular positions of the blades A and B in Fig. 1 correspond to the end of a suction or admission stroke, and the angular positions shown in Fig. 2 correspond to the end of a compression stroke. The blades in Fig. 3 are shown in their reciprocal angular positions at the end of an expansion stroke, and the angular positions of the blades A and B shown in Fig. 4 correspond to the end of an exhaust stroke. The next four strokes are shown in Figs. 5 to 8 in the same sequence as the above mentioned four strokes shown in Figs. 1 to 4. It is apparent that the first four strokes of the working cycle, as shown in Figs. 1 to 4, are performed during a half-turn of the coaxial shafts $M_1$ and $M_2$ and the next four strokes as shown in Figs. 5 to 8 are performed during the next half-turn of the said coaxial shafts. It would be easy, however, to establish either one four-stroke cycle per turn of the coaxial shafts $M_1$ and $M_2$ or more than two four-stroke cycles. Two exhaust ports $S_1$ and $S_2$ are provided at two points diametrically opposed to each other in the peripheral wall of the stationary cylinder C. In this wall two mixture admission ports $G_1$ and $G_2$ are also provided at two points diametrically opposed to each other, the mixture admission ports being controlled by mixture admission valves $V_1$ and $V_2$ respectively, to prevent back-pressures through the admission ports $G_1$ and $G_2$. The mixture admission valves $V_1$ and $V_2$, however, could be disregarded. In the Figures 1 to 8 of the drawings there are illustrated diagrammatically two spark-plugs $K_1$ and $K_2$, screwed in the peripheral wall of the stationary cylinder C at two points diametrically opposed to each other, the spark-plugs being adapted to ignite the air-fuel mixture twice per turn of the rotating shafts $M_1$ and $M_2$. The outer shaft $M_1$ is the driving shaft of the rotary internal combustion engine and it can be connected to a countershaft (not shown) either directly through a suitable joint e. g. the screw-flange coupling I shown in Fig. 9, or indirectly through a suitable gear drive (not shown). The inner shaft $M_2$ is controlled by the driving shaft $M_1$ during its rotating motion, as it will be explained hereinafter with particular reference to Figures 9 and 10. In these figures a rotary internal combustion engine comprises a casting N the main portion of which is of cylindrical shape; two cylindrical chambers C are provided in the casting N, the axes of the cylindrical chambers being located on a common horizontal line. The two rotating shafts $M_1$ and $M_2$ extend horizontally through the end walls $L_1$ and $L_2$ and the intermediate wall $L_3$ of the casting N, so as to turn about the common axis of the cylinders C. Two main blades B and $B_1$ project radially from the driving outer shaft $M_1$ in opposed directions into the cylinders C, and two secondary blades A and $A_1$ project radially from the inner shaft $M_2$ in opposed directions also into the cylinders C. Fixed on the driving shaft $M_1$ are cam members $F_1$ and $F_2$ controlling the mixture admission valves $V_1$ and $V_2$ through usual valve tappet stems O and double armed rocking levers Q. To the end wall $L_1$ of the casting N a gear ring D is attached by means of screws, bolts or other suitable coupling members, the gear ring being provided with inwardly projecting teeth. One end of the driving shaft $M_1$ projects beyond the end wall $L_1$ of the casting N and carries a flywheel V fixed to the driving shaft by means of screws, bolts or other suitable coupling members. One end also of the inner shaft $M_2$ projects beyond the end wall $L_1$ and the flywheel V through a central hole drilled in the flywheel. Keyed on the projecting end of the inner shaft $M_2$ there is a boss T from which two arms $R_1$ and $R_2$ project radially in two directions diametrically opposed to each other. The control for changing the angular position of the inner shaft $M_2$ relatively to the driving shaft $M_1$ during the rotation of the shafts is assured by any suitable means capable of being driven due to the rotation of the main shaft $M_1$ and adapted to drive in turn the inner shaft $M_2$. For this purpose a Maltese cross movement, such as that provided in usual valve grinding devices, may be employed, but a preferred embodiment is that shown in Figures 9, 10 and consisting of two pairs of rotating journals $W_1$, $W_2$ and $W_3$, $W_4$ carried on the flywheel V. Fixed to the rotating journal ends facing the casting N there are pinions $P_1$, $P_2$, $P_3$ and $P_4$ respectively, which engage the teeth of the gear ring D; the other ends of the rotating journals are bent at right angles so as to form cam fingers $E_1$, $E_2$, $E_3$, $E_4$ respectively acting with their side and end edges on the side faces of two radial arms $R_1$, $R_2$ as shown in Figs. 9 and 10.

When the driving shaft $M_1$ is rotated by the combustion pressure of the mixture acting in the rotating chamber H on the blade B attached to the said driving shaft, the flywheel V bolted to the end of the said driving shaft will be rotated. Due to the rotation of the said flywheel V the journals $W_1$ to $W_4$ will also rotate since their pinions $P_1$ to $P_4$ engage the stationary toothed ring D. The two pairs of cam fingers $E_1$, $E_2$ and $E_3$, $E_4$, projecting at right-angles from the said rotating journals $W_1$, $W_2$, $W_3$ and $W_4$ respectively, operate concurrently and positively the radial arms $R_1$, $R_2$ and the inner shaft $M_2$ keyed thereto so as to move the blade A toward and away from the blade B, as shown in the successive cross-sectional views of Figs. 1 to 8 inclusive. A first angular movement of blade A towards blade B (see Figs. 1, 2 or 5, 6) is utilized for compressing the air-fuel mixture previously injected into the chamber H through the admission port $G_1$ or $G_2$; the succeeding motion of the blade B away from the blade A (see Figs. 2, 3 or 6, 7) is caused by the expansion of the combustion gases ignited by the spark plug $K_1$ or $K_2$; the next angular movement of the blade A towards blade B (see Figs. 3, 4 or 7, 8) is utilized for discharging the exhaust gases from the chamber H through the exhaust port $S_1$ or $S_2$; finally the angular movement of blade B away from blade A (see Figs. 4, 5 or 8,1), which is caused by the moment of inertia of the flywheel V, is utilized for sucking the air-fuel mixture into the rotating chamber H through the admission port $V_2$ or $V_1$. During the expansion and admission strokes of the driving blade B, therefore, the back or bottom blade A is held by the cam fingers $W_1$, $W_2$ and $W_3$, $W_4$ against any backward motion, whereas during the compression and exhaust strokes the rotating motion of blade A is accelerated by the cam fingers relatively to the rotating motion of the driving paddle B.

While the specific embodiment as described before with reference to the accompanying drawings relates to a rotary four-stroke internal combustion engine, it is apparent that this invention could be utilized also for a rotary engine working according to the diesel cycle, by both replacing the spark-plugs by usual pressure injectors and employing other cam fingers adapted to subject the air-fuel mixture to a higher compression.

The mathematical expression of the theoretical power in H. P. of the rotary internal combustion engine according to this invention is the following:

$$Ne = \frac{\pi.\alpha°}{180} L.Pm \frac{2n.S}{60t} \cdot \frac{1}{75} Zy°$$

wherein $\alpha°$ is the angular amplitude of expansion degrees, L is the length of the blade B, $Pm$ is the average pressure of the working diagram, $n$ is the number of revolutions per minute, S is the expansion peripheral stroke of blade B, $t$ is the number of explosions per turn, Z is the number of cylinders and $y°$ is the mechanical efficiency of the rotary engine.

It is apparent that the number of cylinders and the number of working cycles per turn can be varied from those specified hereinbefore with reference to the accompanying drawings. I wish it understood that my invention is not limited to any specific construction, arrangement or form of the parts, as it is capable of numerous modifications and changes without departing from the spirit of the claims.

I claim:

1. In a rotary internal combustion engine, a stationary cylinder having closed ends and a side wall formed with a pair of diametrically opposed fuel admission ports and with a pair of diametrically opposed exhaust ports angularly spaced about the circumference of the side wall from said admission ports, a pair of coaxial shafts journalled in the ends of the cylinder and extending within the cylinder axially thereof, one within the other, said other shaft having a slot, a blade on said one shaft projecting through the slot, a blade on the second shaft at one side of the slot, said blades defining between them a combustion chamber communicating with successively following ports during rotation of the shafts, said blades having wiping contact at their outer ends with the cylinder side wall, a stationary ring gear on the cylinder, a flywheel connected to said other shaft for rotation therewith, a pinion journalled in the flywheel in mesh with the ring gear, a radial arm secured to said one shaft and extending adjacent the pinion, and a cam finger extending radially of and turning with said pinion, said finger camming the arm on each rotation of the pinion through 360 degrees in a direction to reduce the angular distance between the blades during rotation of the shafts, thereby in turn to reduce the volumetric capacity of said combustion chamber following its being brought into communication with successively following ports during the fuel admission, compression, expansion, and exhaust stages of operation of the engine, said cam finger being so formed and arranged as to bias the arm in a direction to shift the blade of said one shaft toward the blade of said other shaft during the compression and exhaust stages of operation, and to move free of the arm during the admission and expansion stages, for shifting of the blade of said one shaft away from the blade of said other shaft by expansion of the fuel on combustion thereof and by inertia of the flywheel, respectively, occurring during said expansion and admission stages.

2. A rotary internal combustion engine as in claim 1 wherein said slot extends in width through ninety degrees of the circumference of said other shaft, to dispose the opposite side edges of the slot as abutments in the path of the blade of said one shaft limiting rotational movement of said one shaft relative to said other shaft to a ninety degree travel in either direction.

3. A rotary internal combustion engine as in claim 2 wherein the blade of said other shaft is formed upon one of said edges of the slot, the blade of said one shaft when engaged by said one side edge extending at an acute angle to the blade of said other shaft, and when engaged by the other side edge of the slot extending at right angles to the blade of said other shaft.

4. A rotary internal combustion engine as in claim 1, further including a second pinion and a second cam finger secured to the second pinion to turn therewith, said arm extending between the two pinions and the second cam finger being arranged to bias the arm in an opposite direction, to provide means insuring a timely increase in the angular distance between the blades following each reduction of said angular distance by the cam action of the first cam finger.

5. A rotary internal combustion engine as in claim 1 wherein said cam finger is formed as a straight-sided member extending substantially parallel to the arm in side-by-side, substantially, longitudinally contacting relation therewith when the blades are at a maximum angular distance, and extending normally to the arm on turning of the pinion through ninety degrees to change said angular distance from a maximum to a minimum value responsive to a ninety degree rotational movement of the pinion.

6. A rotary internal combustion engine as in claim 5 wherein said gear and pinion are of a ratio such that the pinion will make four full turns to each rotation of said other shaft through 360 degrees, thus to effect four movements of the blade of said one shaft toward the blade of said other shaft during each rotation of said other shaft through 360 degrees, two of said movements being in compression and the other two being in exhaust stages of the engine operation.

References Cited in the file of this patent

UNITED STATES PATENTS

| 1,487,829 | Arrighi | Mar. 25, 1924 |
| 1,497,400 | Ball | June 10, 1924 |
| 1,729,242 | Bregere | Sept. 24, 1929 |

FOREIGN PATENTS

| 358,324 | Germany | Sept. 18, 1922 |